United States Patent
Lee et al.

(10) Patent No.: US 9,482,130 B2
(45) Date of Patent: Nov. 1, 2016

(54) SELECTIVE CATALYTIC REDUCTION AND CATALYTIC REGENERATION SYSTEM

(71) Applicant: Doosan Engine Co., Ltd., Gyeongsangnam-do (KR)

(72) Inventors: Jae Moon Lee, Gyeongsangnam-do (KR); Sang Jin Kim, Gyeongsangnam-do (KR); Chang Seong Ryu, Gyeongsangnam-do (KR); Chang Hee Lee, Gyeongsangnam-do (KR); Gyun Lee, Gyeongsangnam-do (KR)

(73) Assignee: Doosan Engine Co., Ltd., Gyeongsangnam-do (KR)

( * ) Notice: Subject to any disclaimer, the term of this patent is extended or adjusted under 35 U.S.C. 154(b) by 0 days.

(21) Appl. No.: 14/901,188

(22) PCT Filed: Dec. 6, 2013

(86) PCT No.: PCT/KR2013/011262
§ 371 (c)(1),
(2) Date: Dec. 28, 2015

(87) PCT Pub. No.: WO2014/208839
PCT Pub. Date: Dec. 31, 2014

(65) Prior Publication Data
US 2016/0131000 A1    May 12, 2016

(30) Foreign Application Priority Data
Jun. 28, 2013 (KR) .................. 10-2013-0075789

(51) Int. Cl.
*F01N 3/00* (2006.01)
*F01N 3/20* (2006.01)
(Continued)

(52) U.S. Cl.
CPC ........... *F01N 3/206* (2013.01); *B01D 53/9409* (2013.01); *B01D 53/9495* (2013.01);
(Continued)

(58) Field of Classification Search
CPC . F01N 3/2053; F01N 3/208; B01D 53/9409; B01D 53/9495; B01D 53/96
USPC .......................................................... 60/295
See application file for complete search history.

(56) References Cited

U.S. PATENT DOCUMENTS 5,158,753 A * 10/1992 Take ................... F01N 3/0814
422/173
6,173,568 B1 * 1/2001 Zurbig ............... B01D 53/9431
123/406.53

(Continued)

FOREIGN PATENT DOCUMENTS

| JP | 2009-024503 A | 2/2009 |
| JP | 2010-229929 A | 10/2010 |
| KR | 10-0924591 B1 | 10/2009 |

*Primary Examiner* — Jason Shanske
(74) *Attorney, Agent, or Firm* — Young Basile Hanlon & MacFarlane, P.C.

(57) ABSTRACT

A selective catalytic reduction and catalytic regeneration system includes: a main exhaust flow path; a reactor which is installed on the main exhaust flow path; a bypass exhaust flow path which branches off from the main exhaust flow path, and bypasses the reactor; an ammonia injection unit, which injects ammonia to the exhaust gas which is to flow into the reactor; a hydrolysis chamber, which produces ammonia to be supplied to the ammonia injection unit; a branch flow path, which branches off from the main exhaust flow path at a front side of the reactor; a recirculation flow path, which branches off from the main exhaust flow path at a rear side of the reactor, and merges with the branch flow path; and a multifunctional flow path, which connects the hydrolysis chamber with a point where the branch flow path and the recirculation flow path merge together.

19 Claims, 5 Drawing Sheets

(51) Int. Cl.
  B01D 53/94  (2006.01)
  B01D 53/96  (2006.01)
  F01N 3/28   (2006.01)
(52) U.S. Cl.
  CPC ............... B01D53/96 (2013.01); F01N 3/208 (2013.01); F01N 3/2053 (2013.01); F01N 3/2073 (2013.01); F01N 3/2892 (2013.01); *B01D 2251/2067* (2013.01); *B01D 2258/012* (2013.01); *F01N 2240/25* (2013.01); *F01N 2240/40* (2013.01); *F01N 2260/04* (2013.01); *F01N 2410/04* (2013.01); *F01N 2410/12* (2013.01); *F01N 2570/14* (2013.01); *F01N 2610/02* (2013.01); *F01N 2610/085* (2013.01); *F01N 2610/10* (2013.01); *F01N 2610/146* (2013.01); *Y02T 10/24* (2013.01)

(56) References Cited

U.S. PATENT DOCUMENTS

| | | | |
|---|---|---|---|
| 8,015,802 B2 * | 9/2011 | Nishiyama | B01D 53/9431 60/286 |
| 2004/0118106 A1 * | 6/2004 | Liang | F01N 3/208 60/278 |
| 2009/0199537 A1 | 8/2009 | Sisken et al. | |
| 2010/0132342 A1 | 6/2010 | Svensson et al. | |
| 2010/0251700 A1 * | 10/2010 | Wan | F01N 3/0231 60/287 |
| 2011/0113759 A1 * | 5/2011 | Tilinski | F01N 3/2066 60/295 |
| 2011/0283681 A1 * | 11/2011 | Doring | F01N 3/023 60/274 |

\* cited by examiner

SELECTIVE CATALYTIC REDUCTION AND CATALYTIC REGENERATION SYSTEM

TECHNICAL FIELD

An exemplary embodiment of the present disclosure relates to a selective catalytic reduction and catalytic regeneration system which reduces nitrogen oxide containing exhaust gas by using a selective catalytic reduction reaction and regenerates a catalyst used for the reduction reaction.

BACKGROUND

In general, a selective catalytic reduction (SCR) system refers to a system which reduces nitrogen oxide by purifying exhaust gas produced in diesel engines, boilers, incinerators and the like.

The selective catalytic reduction system allows nitrogen oxide contained in exhaust gas to react with a reducing agent by allowing both the exhaust gas and the reducing agent to pass through a reactor in which the catalyst is installed, thereby reducing the nitrogen oxide to nitrogen and water vapor.

The selective catalytic reduction system uses and directly injects urea as a reducing agent for reducing nitrogen oxide, or uses and injects ammonia ($NH_3$) created through hydrolysis of urea.

However, in a case in which urea is injected directly to exhaust gas at a temperature lower than 250° C., there is a problem when a nozzle is clogged or a flow of exhaust gas is hindered due to by-products, such as biuret, cyanuric acid, melamine, and ammeline, which are produced when the urea is decomposed.

In addition, to create ammonia through hydrolysis of urea, a temperature in a hydrolysis chamber needs to be increased to a temperature required for a hydrolysis reaction by using an electric heater or a burner, and as a result, there is a problem in that a large amount of energy is separately consumed for the hydrolysis.

SUMMARY

As described herein, an exemplary embodiment of the present disclosure provides a selective catalytic reduction and catalytic regeneration system capable of minimizing overall energy to be consumed to reduce nitrogen oxide contained in exhaust gas, and effectively regenerating a catalyst used for a reduction reaction.

According to an exemplary embodiment of the present disclosure, a selective catalytic reduction and catalytic regeneration system includes: a main exhaust flow path along which exhaust gas containing nitrogen oxide (NOx) moves; a reactor which is installed on the main exhaust flow path and includes a catalyst for reducing nitrogen oxide (NOx) in the exhaust gas; a bypass exhaust flow path which branches off from the main exhaust flow path, bypasses the reactor, and merges with the main exhaust flow path again; an ammonia injection unit which is installed on the main exhaust flow path, and injects ammonia ($NH_3$) to the exhaust gas which is to flow into the reactor; a hydrolysis chamber which is supplied with urea, and produces ammonia to be supplied to the ammonia injection unit; an ammonia supply flow path which connects the ammonia injection unit with the hydrolysis chamber; a branch flow path which branches off from the main exhaust flow path at a front side of the reactor; a recirculation flow path which branches off from the main exhaust flow path at a rear side of the reactor, and merges with the branch flow path; and a multifunctional flow path which connects the hydrolysis chamber with a point where the branch flow path and the recirculation flow path merge together.

The selective catalytic reduction and catalytic regeneration system may further include: a first main exhaust valve which is installed on the main exhaust flow path between the urea injection unit and a point where the branch flow path branches off; a second main exhaust valve which is installed on the main exhaust flow path between a point where the recirculation flow path branches off and a point where the bypass exhaust flow path merges; a bypass exhaust valve which is installed on the bypass exhaust flow path; a branch valve which is installed on the branch flow path; and a recirculation valve which is installed on the recirculation flow path. The first main exhaust valve, the second main exhaust valve, the bypass exhaust valve, the branch valve, and the recirculation valve may be separately operated in any one operation state of a purification operation state and a regeneration operation state.

In the purification operation state, the first main exhaust valve and the second main exhaust valve may be opened, and the bypass exhaust valve and the recirculation valve may be closed, and in the regeneration operation state, the first main exhaust valve and the second main exhaust valve may be closed, and the bypass exhaust valve and the recirculation valve may be opened.

The selective catalytic reduction and catalytic regeneration system may further include: a urea supply unit which supplies urea to the hydrolysis chamber; and a chamber connecting flow path which connects the urea supply unit with the hydrolysis chamber.

The selective catalytic reduction and catalytic regeneration system may further include: a urea injection unit which is installed on the main exhaust flow path, and injects urea to the exhaust gas which is to flow into the reactor; and a urea supply flow path which connects the urea supply unit directly to the urea injection unit.

The ammonia injection unit may be positioned to be relatively more adjacent to the reactor than the urea injection unit.

The selective catalytic reduction and catalytic regeneration system may further include: an ammonia supply valve which is installed on the chamber connecting flow path; and a urea supply valve which is installed on the urea supply flow path.

In the purification operation state, one or more of the ammonia supply valve and the urea supply valve may be opened. In the regeneration operation state, the ammonia supply valve and the urea supply valve may be closed.

In the purification operation state, when a temperature of exhaust gas, which flows into the reactor through the main exhaust flow path, is a first preset temperature, the branch valve and the ammonia supply valve may be opened, and the urea supply valve may be closed, such that ammonia is injected into the main exhaust flow path.

In the purification operation state, when a temperature of exhaust gas, which flows into the reactor through the main exhaust flow path, is a second preset temperature, the branch valve, the ammonia supply valve, and the urea supply valve may be opened, such that both ammonia and urea are injected into the main exhaust flow path.

In the purification operation state, when a temperature of exhaust gas, which flows into the reactor through the main exhaust flow path, is a third preset temperature, the branch valve and the ammonia supply valve may be closed, and the urea supply valve may be opened, such that urea is injected into the main exhaust flow path.

The selective catalytic reduction and catalytic regeneration system may further include a heating device which is installed on the multifunctional flow path, and increases a temperature of a fluid flowing along the multifunctional flow path.

A burner may be used as the heating device, and the selective catalytic reduction and catalytic regeneration system may further include an outside air supply flow path which is connected with the multifunctional flow path so as to supply outside air to the heating device.

The selective catalytic reduction and catalytic regeneration system may further include an outside air supply valve which is installed on the outside air supply flow path, in which the outside air supply valve is opened when the heating device is operated.

The selective catalytic reduction and catalytic regeneration system may further include an air filter which is installed on the outside air supply flow path.

The selective catalytic reduction and catalytic regeneration system may further include a blower which is installed on the multifunctional flow path.

According to the exemplary embodiment of the present disclosure, the selective catalytic reduction and catalytic regeneration system may minimize overall energy which is to be consumed to reduce nitrogen oxide contained in exhaust gas, and may effectively regenerate a catalyst used for a reduction reaction.

DETAILED DESCRIPTION

Figure 1:
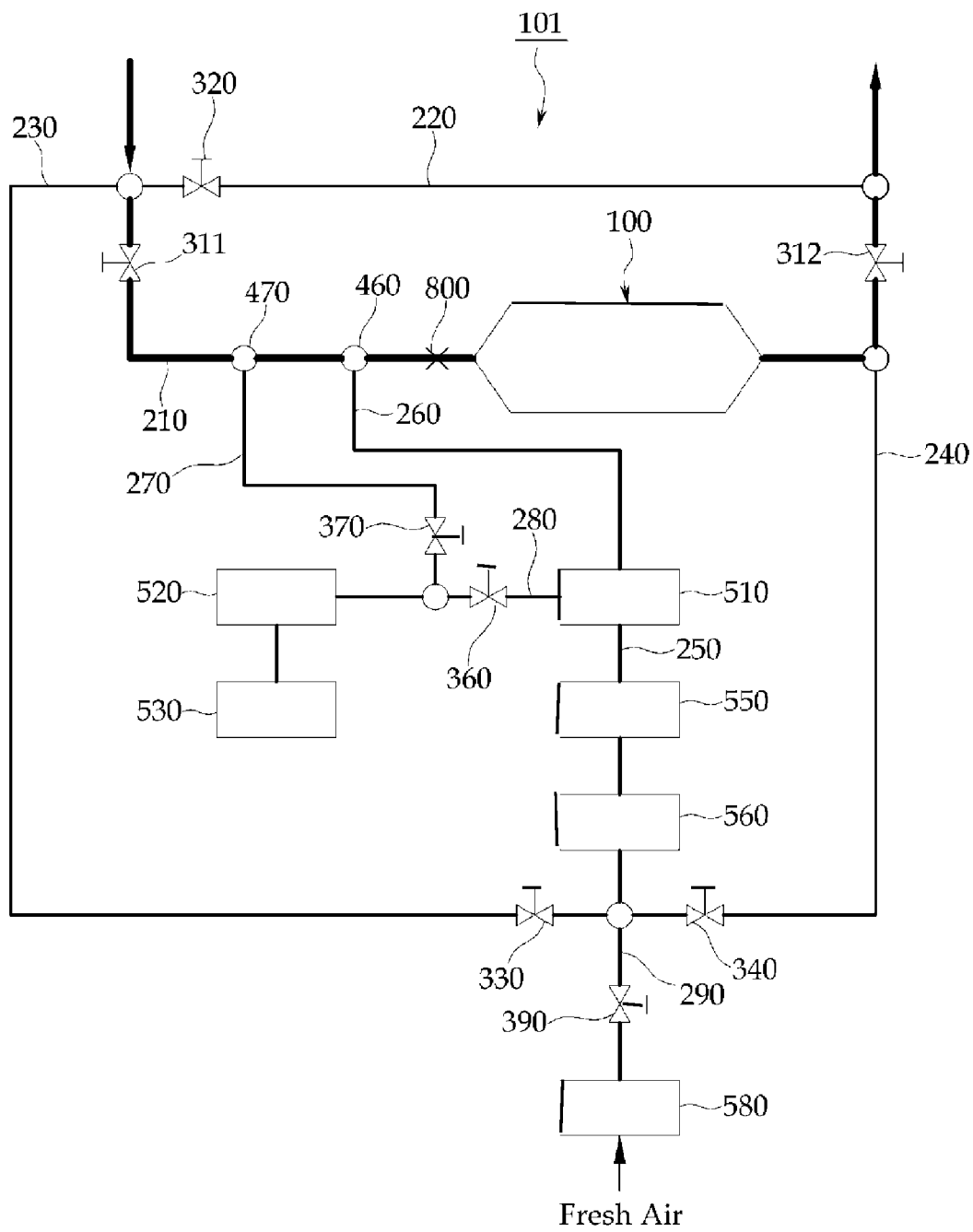
FIG. 1 is a configuration diagram illustrating a selective catalytic reduction and catalytic regeneration system according to an exemplary embodiment of the present disclosure.

Hereinafter, exemplary embodiments of the present disclosure will be described in detail with reference to the accompanying drawings so that those skilled in the technical field to which the present disclosure pertains may carry out the exemplary embodiments. However, the present disclosure may be implemented in various different ways, and is not limited to the exemplary embodiments described herein.

It is noted that the drawings are schematic, and are not illustrated based on actual scales. Relative dimensions and proportions of parts illustrated in the drawings are exaggerated or reduced in size for the purpose of clarity and convenience in the drawings, and any dimension is just illustrative but not restrictive. Further, the same reference numerals designate the same structures, elements or components illustrated in two or more drawings in order to exhibit similar characteristics.

Exemplary embodiments of the present disclosure illustrate ideal exemplary embodiments in more detail. As a result, various modifications of the drawings are expected. Therefore, the exemplary embodiments are not limited to specific forms in regions illustrated in the drawings, and for example, include modifications of forms by the manufacture.

Hereinafter, a selective catalytic reduction (SCR) and catalytic regeneration system 101 according to an exemplary embodiment of the present disclosure will be described with reference to FIG. 1.

As illustrated in FIG. 1, the selective catalytic reduction and catalytic regeneration system 101 according to the exemplary embodiment includes a main exhaust flow path 210, a reactor 100, a bypass exhaust flow path 220, an ammonia injection unit 460, a hydrolysis chamber 510, an ammonia supply flow path 260, a branch flow path 230, a recirculation flow path 240, and a multifunctional flow path 250.

In addition, the selective catalytic reduction and catalytic regeneration system 101 according to the exemplary embodiment may further include a first main exhaust valve 311, a second main exhaust valve 312, a bypass exhaust valve 320, a branch valve 330, and a recirculation valve 340.

In addition, the selective catalytic reduction and catalytic regeneration system 101 according to the exemplary embodiment may further include a urea supply unit 520, a urea storage unit 530, a urea injection unit 470, a urea supply flow path 270, a chamber connecting flow path 280, an ammonia supply valve 360, and a urea supply valve 370.

In addition, the selective catalytic reduction and catalytic regeneration system 101 according to the exemplary embodiment may further include a heating device 550, an outside air supply flow path 290, an outside air supply valve 390, an air filter 580, a mixer 800, and a blower 560.

The main exhaust flow path 210 is a passage along which exhaust gas containing nitrogen oxide (NOx) moves. For example, exhaust gas, which is produced during a combustion process in a diesel engine, may pass through the main exhaust flow path 210. In this case, the diesel engine may be a low-speed or medium-speed diesel engine used for a ship.

The reactor 100 is installed on the main exhaust flow path 210. The reactor 100 includes a catalyst which reduces nitrogen oxide (NOx) contained in exhaust gas. The catalyst promotes a reaction between nitrogen oxide (NOx) contained in exhaust gas and a reducing agent, thereby reducing the nitrogen oxide (NOx) to nitrogen and water vapor.

The catalyst may be made of various materials, such as zeolite, vanadium, and platinum, which are publicly known to those skilled in the art. For example, the catalyst may have an active temperature within a range from 250° C. to 350° C. Here, the active temperature refers to a temperature at which the catalyst may stably reduce nitrogen oxide without being poisoned. In a case in which the catalyst reacts out of the range of the active temperature, the catalyst is poisoned, and efficiency of the catalyst deteriorates.

In addition, a housing of the reactor 100 may be made of, for example, stainless steel.

The bypass exhaust flow path 220 branches off from the main exhaust flow path 210, bypasses the reactor 100, and then merges with the main exhaust flow path 210 again. When an inflow of exhaust gas into the reactor 100 is shut off, the bypass exhaust flow path 220 allows the exhaust gas to bypass the reactor 100 and then to be discharged to the outside.

The ammonia injection unit 460 is installed on the main exhaust flow path 210, and injects ammonia ($NH_3$) to the exhaust gas which is to flow into the reactor 100. The injected ammonia is mixed with the exhaust gas, and reduces nitrogen oxide contained in the exhaust gas.

In addition, in the exemplary embodiment of the present disclosure, the ammonia injection unit 460 may inject isocyanic acid (HNCO) together with ammonia. The isocyanic acid may be decomposed into ammonia under a high-temperature environment.

The urea injection unit 470 is installed on the main exhaust flow path 210, and injects urea to exhaust gas which is to flow into the reactor 100. The injected urea is mixed with exhaust gas, and decomposed into ammonia by thermal energy which is contained in the exhaust gas when the exhaust gas is at a high temperature. Similar to the ammonia injected by the ammonia injection unit 460, the ammonia, which is produced as described above, reduces nitrogen oxide contained in exhaust gas.

In the exemplary embodiment of the present disclosure, the ammonia injection unit 460 is positioned to be relatively more adjacent to the reactor 100 than the urea injection unit 470. That is, the urea injection unit 470 is installed to be relatively far away from the reactor 100. The reason is to ensure a time delay and a marginal space until the urea injected by the urea injection unit 470 is mixed with exhaust gas, and then decomposed into ammonia by thermal energy of exhaust gas.

The mixer 800 is installed on the main exhaust flow path 210 between the ammonia injection unit 460 and the reactor 100. The mixer 800 uniformly mixes exhaust gas with ammonia, which is a reducing agent, before the exhaust gas flows into the reactor 100.

The hydrolysis chamber 510 is supplied with urea (CO(NH$_2$)$_2$), and hydrolyzes the urea to produce ammonia (NH$_3$) to be supplied to the ammonia injection unit 460. When the urea (CO(NH$_2$)$_2$) is hydrolyzed in the hydrolysis chamber 510, isocyanic acid (HNCO) is produced together with ammonia (NH$_3$).

The ammonia supply flow path 260 connects the hydrolysis chamber 510 and the ammonia injection unit 460, and delivers the ammonia produced in the hydrolysis chamber 510 to the ammonia injection unit 460.

The urea supply unit 520 supplies urea to the hydrolysis chamber 510. Further, the chamber connecting flow path 280 connects the urea supply unit 520 with the hydrolysis chamber 510. In addition, the urea supply flow path 270 connects the urea supply unit 520 directly to the urea injection unit 470.

As described above, the urea supply unit 520 may supply urea to the hydrolysis chamber 510 through the chamber connecting flow path 280, or supply urea to the urea injection unit 470 through the urea supply flow path 270.

The branch flow path 230 branches off from the main exhaust flow path 210 at the front side of the reactor 100. Further, the recirculation flow path 240 branches off from the main exhaust flow path 210 at the rear side of the reactor 100, and merges with the branch flow path 230.

The multifunctional flow path 250 connects the hydrolysis chamber 510 with a point where the branch flow path 230 and the recirculation flow path 240 merge together.

As described above, according to the exemplary embodiment of the present disclosure, exhaust gas, which does not pass through the reactor 100, may flow into the hydrolysis chamber 510 via the branch flow path 230 and the multifunctional flow path 250. That is, when a temperature of the exhaust gas, which does not pass through the reactor 100, is relatively high, exhaust gas is supplied to the hydrolysis chamber 510 through the branch flow path 230 and the multifunctional flow path 250, and thermal energy of the exhaust gas may be utilized to hydrolyze urea in the hydrolysis chamber 510.

In addition, according to the exemplary embodiment of the present disclosure, exhaust gas, which has passed through the reactor 100, may pass through the branch flow path 230, the multifunctional flow path 250, the hydrolysis chamber 510, the ammonia supply flow path 260, and the ammonia injection unit 460 in sequence, and then may flow back into the reactor 100. That is, the exhaust gas, which has passed through the reactor 100, may be recirculated back to the reactor 100.

The heating device 550 is installed on the multifunctional flow path 250, and increases a temperature of a fluid flowing along the multifunctional flow path 250. In the exemplary embodiment of the present disclosure, the heating device 550 may be a burner. Specifically, the heating device 550 may include a fuel supply device, a control device which controls the amount of supply fuel in order to control a heating temperature, and a stabilization device.

In addition, the heating device 550 may be a plasma burner of which the performance is improved by using plasma.

The outside air supply flow path 290 may be optionally provided in a case in which the burner is used as the heating device 550 in the exemplary embodiment of the present disclosure. The outside air supply flow path 290 is connected with the multifunctional flow path 250 so as to supply outside air to the heating device 550. That is, in a case in which the burner is used as the heating device 550, the outside air supply flow path 290 supplies oxygen required for combustion in the burner.

The air filter 580 is installed on the outside air supply flow path 290. The air filter 580 removes foreign substances contained in outside air which flows in through the outside air supply flow path 290.

The blower 560 is installed on the multifunctional flow path 250. The blower 560 provides power to the fluid which passes through the multifunctional flow path 250. That is, the blower 560 may provide power such that exhaust gas flows into the hydrolysis chamber 510 through the branch flow path 230 and the multifunctional flow path 250, or may provide power such that exhaust gas circulates through the recirculation flow path 240 and the multifunctional flow path 250.

The first main exhaust valve 311 is installed on the main exhaust flow path 210 at the front side of the reactor 100, and the second main exhaust valve 312 is installed on the main exhaust flow path 210 at the rear side of the reactor 100.

In this case, the first main exhaust valve 311 may be installed on the main exhaust flow path 210 between the urea injection unit 470 and a point where the branch flow path 230 branches off. Further, the second main exhaust valve 312 may be installed on the main exhaust flow path 210 between a point where the recirculation flow path 240 branches off and a point where the bypass exhaust flow path 220 and the main exhaust flow path 210 merge together again.

The bypass exhaust valve 320 is installed on the bypass exhaust flow path 220, the branch valve 330 is installed on the branch flow path 230, and the recirculation valve 340 is installed on the recirculation flow path 240.

In addition, the ammonia supply valve 360 is installed on the chamber connecting flow path 280, and the urea supply valve 370 is installed on the urea supply flow path 270.

In addition, the outside air supply valve 390 is installed on the outside air supply flow path 290.

Here, the first main exhaust valve 311 and the bypass exhaust valve 320 may be integrated into a single three-way valve.

In addition, the first main exhaust valve 311 and the branch valve 330 may be integrated into a single three-way valve.

In addition, the first main exhaust valve 311, the bypass exhaust valve 320, and the branch valve 330 may be integrated into a single four-way valve.

In addition, the branch valve 330 and the recirculation valve 340 may be integrated into a three-way valve, and the branch valve 330, the recirculation valve 340, and the outside air supply valve 390 may be integrated into a four-way valve.

As described above, the respective valves may be modified and implemented in various ways in accordance with technologies publicly known to those skilled in the art, and in the exemplary embodiment of the present disclosure, the positions and types of the valves are not limited to the valves illustrated in FIG. 1.

The selective catalytic reduction and catalytic regeneration system 101 according to the exemplary embodiment of the present disclosure is separately operated in any one operation state of a purification operation state and a regeneration operation state.

That is, the first main exhaust valve 311, the second main exhaust valve 312, the bypass exhaust valve 320, the branch valve 330, the recirculation valve 340, the ammonia supply valve 360, the urea supply valve 370, and the outside air supply valve 390 are opened and closed separately in accordance with the purification operation state and the regeneration operation state.

Hereinafter, an operation principle of the selective catalytic reduction and catalytic regeneration system 101 according to the exemplary embodiment of the present disclosure will be specifically described with reference to FIGS. 2 to 5.

The selective catalytic reduction and catalytic regeneration system 101 according to the exemplary embodiment of the present disclosure is separately operated in the purification operation state or the regeneration operation state.

The purification operation state refers to a state in which an operation of reducing nitrogen oxide contained in exhaust gas flowing along the main exhaust flow path 210 is carried out. In addition, in the purification operation state, the selective catalytic reduction and catalytic regeneration system 101 may be operated by three steps in accordance with a temperature of exhaust gas flowing along the main exhaust flow path 210.

As described above, in the purification operation state, the selective catalytic reduction and catalytic regeneration system 101 is separately operated by three steps based on a first preset temperature, a second preset temperature, and a third preset temperature.

Specifically, the purification operation state may be divided into a low-temperature step in which a temperature of exhaust gas flowing into the reactor 100 is the first preset temperature, a medium-temperature step in which a temperature of exhaust gas flowing into the reactor 100 is the second preset temperature, and a high-temperature step in which a temperature of exhaust gas flowing into the reactor 100 is the third preset temperature. After the diesel engine, which discharges exhaust gas, is initially operated, a temperature of exhaust gas passing through the main exhaust flow path 210 is increased as operating time is increased.

For example, the first preset temperature may be lower than 250° C., the second preset temperature may be equal to or higher than 250° C. and lower than 300° C., and the third preset temperature may be equal to or higher than 300° C.

However, in the exemplary embodiment of the present disclosure, the ranges of the first preset temperature, the second preset temperature, and the third preset temperature may be changed depending on a use environment.

Figure 2:
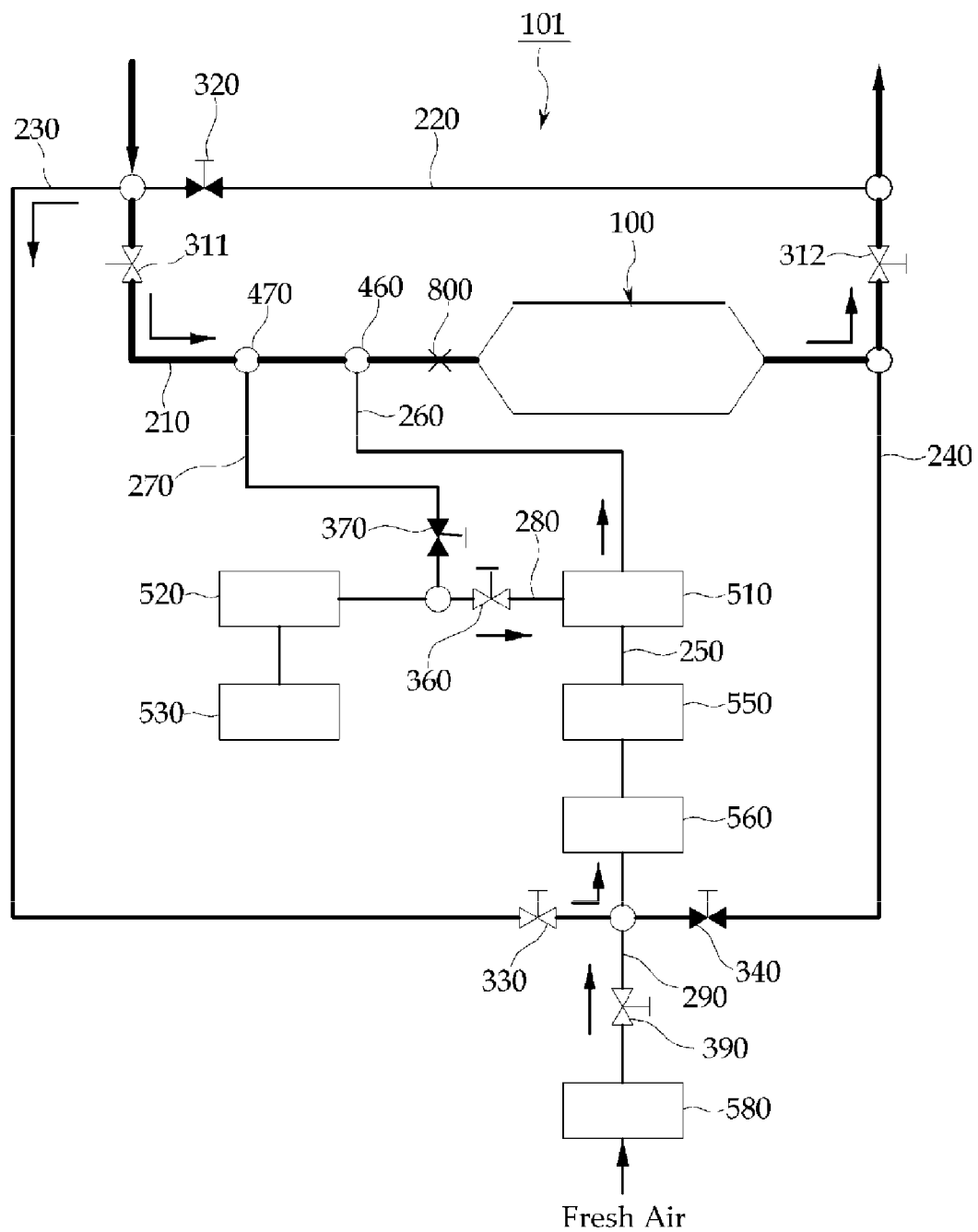
FIGS. 2 to 5 are configuration diagrams illustrating a state in which the selective catalytic reduction and catalytic regeneration system in FIG. 1 is operated.

FIG. 2 illustrates the low-temperature step in the purification operation state. As illustrated in FIG. 2, in the purification operation state in which nitrogen oxide contained in exhaust gas is reduced, the first main exhaust valve 311 and the second main exhaust valve 312 are basically opened. Further, the bypass exhaust valve 320 and the recirculation valve 340 are closed.

In addition, in the low-temperature step in the purification operation state, the branch valve 330 and the ammonia supply valve 360 are opened, and the urea supply valve 370 is closed, such that ammonia is injected into the main exhaust flow path 210.

In addition, to hydrolyze urea in the hydrolysis chamber 510, the heating device 550 heats exhaust gas supplied from the branch flow path 230 which branches off from the main exhaust flow path 210 before exhaust gas passes through the reactor 100, and the heated exhaust gas flows into the hydrolysis chamber 510 and provides thermal energy for hydrolyzing urea.

In this case, the blower 560 provides power to exhaust gas flowing along the branch flow path 230 and the multifunctional flow path 250.

In addition, in a case in which a burner is used as the heating device 550, the outside air supply valve 390 installed on the outside air supply flow path 290 is also opened to provide the heating device 550 with oxygen required for combustion.

When urea is injected directly to the main exhaust flow path 210 when a temperature of exhaust gas, which flows into the reactor through the main exhaust flow path 210, is lower than 250° C., by-products such as biuret, cyanuric acid, melamine, and ammeline are produced when urea is decomposed, and may clog a nozzle or hinder a flow of exhaust gas.

However, according to the exemplary embodiment of the present disclosure, when a temperature of exhaust gas flowing into the reactor 100 is lower than 250° C., urea is not injected directly into the main exhaust flow path 210, but ammonia, which has been produced by efficiently hydrolyzing urea in the hydrolysis chamber 510 by using exhaust gas, at a high temperature, heated by the heating device 550, may be injected into the main exhaust flow path 210. Therefore, it is possible to minimize the production of by-products during a process of reducing nitrogen oxide contained in the exhaust gas by using ammonia as a reducing agent.

Figure 3:
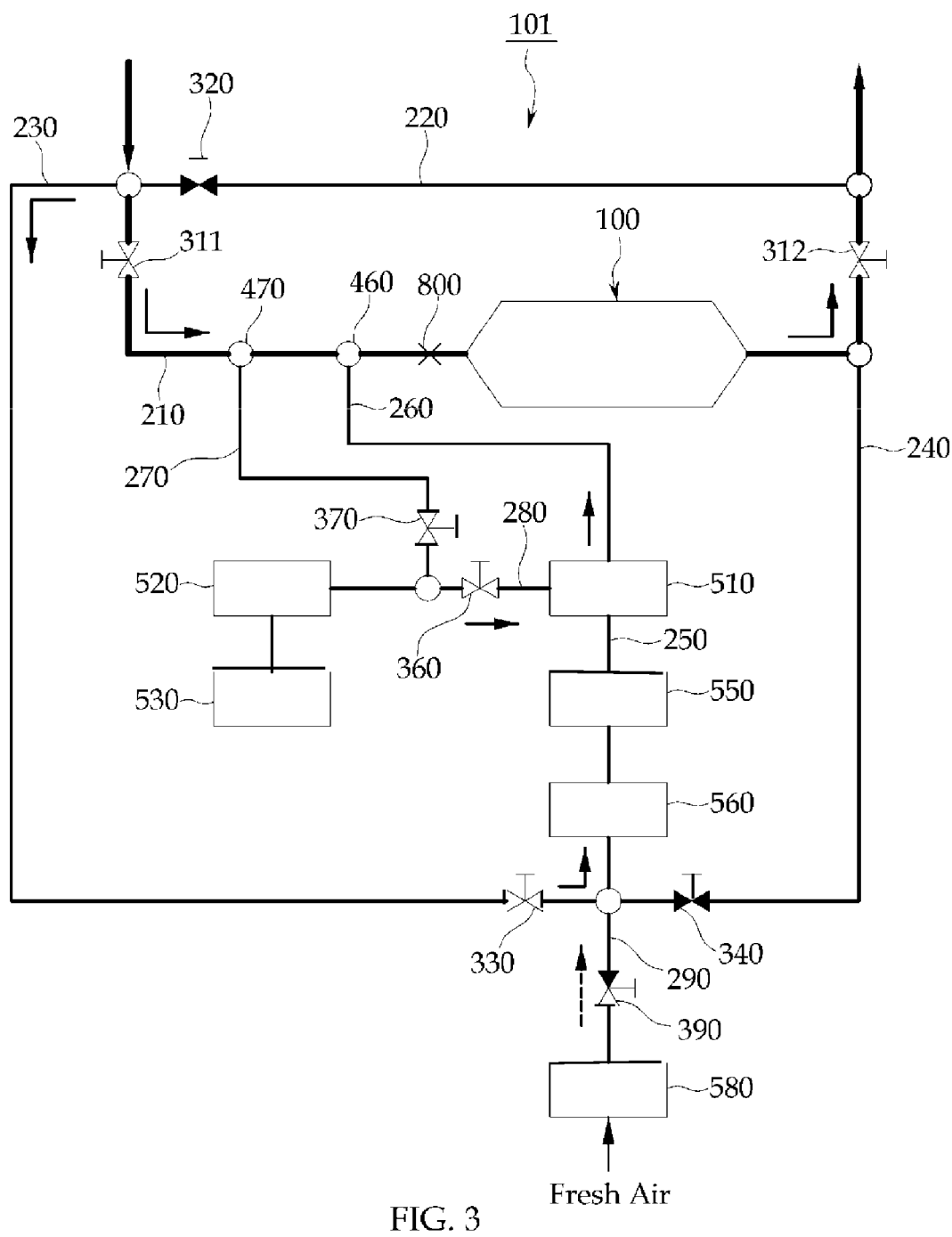

FIG. 3 illustrates the medium-temperature step in the purification operation state. As illustrated in FIG. 3, in the purification operation state in which nitrogen oxide contained in the exhaust gas is reduced, the first main exhaust valve 311 and the second main exhaust valve 312 are basically opened. Further, the bypass exhaust valve 320 and the recirculation valve 340 are closed.

In addition, in the medium-temperature step in the purification operation state, the branch valve 330, the ammonia supply valve 360, and the urea supply valve 370 are opened. That is, the urea and the ammonia are both injected into the main exhaust flow path 210.

Further, in the medium-temperature step, a small amount of ammonia as much as urea injected through the urea injection unit 470 is injected through the ammonia injection unit 460. That is, in the medium-temperature step in which a temperature of exhaust gas flowing into the reactor 100 is equal to or higher than 250° C. and lower than 300° C., the hydrolysis of urea, which is carried out by thermal energy of exhaust gas flowing along the main exhaust flow path 210, may be somewhat expected. As a result, the amount of ammonia, which needs to be produced in the hydrolysis chamber 510, may be reduced compared to the low-temperature step.

Therefore, in the medium-temperature step, electric power, fuel and the like, which are required to operate the heating device 550 and the blower 560, may be reduced, such that relatively low operating costs are required.

In addition, in a case in which a burner is used as the heating device 550, the outside air supply valve 390 installed on the outside air supply flow path 290 is also partially or entirely opened to provide the heating device 550 with oxygen required for combustion.

Figure 4:
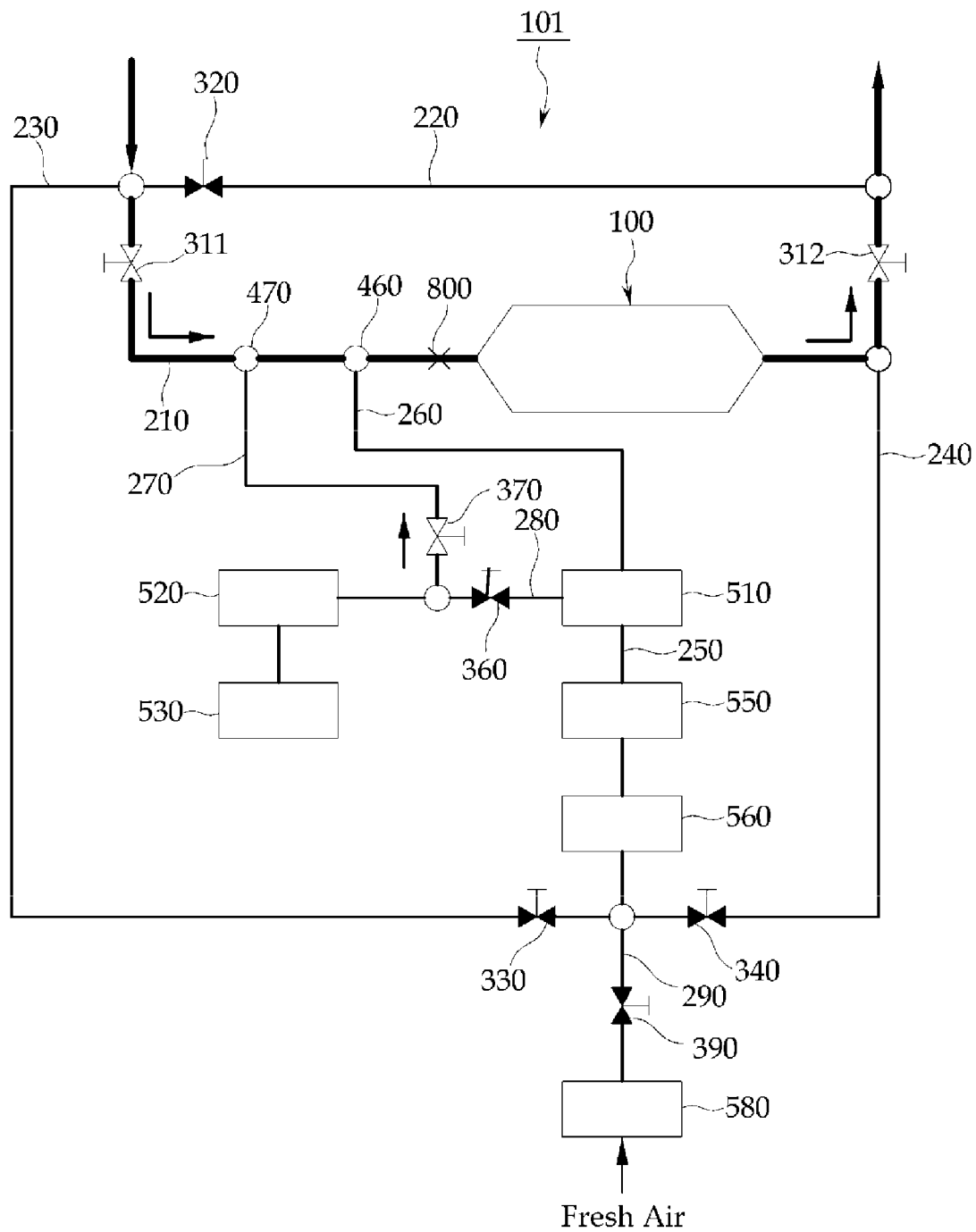

FIG. 4 illustrates the high-temperature step in the purification operation state. As illustrated in FIG. 4, in the purification operation state in which nitrogen oxide contained in exhaust gas is reduced, the first main exhaust valve 311 and the second main exhaust valve 312 are basically opened. Further, the bypass exhaust valve 320 and the recirculation valve 340 are closed.

In addition, in the high-temperature step in the purification operation state, the branch valve 330 and the ammonia supply valve 360 are closed, and the urea supply valve 370 is opened. That is, urea is injected into the main exhaust flow path 210.

In the high-temperature step in which a temperature of exhaust gas flowing into the reactor 100 is equal to or higher than 300° C., the hydrolysis of urea may be stably carried out by thermal energy of the exhaust gas flowing along the main exhaust flow path 210. Therefore, it is not necessary to hydrolyze urea in the hydrolysis chamber 510 in order to produce ammonia.

As described above, in the high-temperature step, it is not necessary to produce ammonia in the hydrolysis chamber 510, such that it is possible to stop the operations of the heating device 550 and the blower 560, and close the outside air supply valve 390 on the outside air supply flow path 290.

That is, in the high-temperature step, since electric power, fuel and the like are not consumed to operate the heating device 550 and the blower 560, it is possible to improve overall energy utilization efficiency of the selective catalytic reduction and catalytic regeneration system 101.

The regeneration operation state is a state in which an operation of regenerating the catalyst installed in the reactor 100 is carried out when the catalyst is poisoned.

When a reduction reaction occurs to reduce nitrogen oxide in the exhaust gas at a relatively low temperature equal to or higher than 150° C. and lower than 250° C., sulfur oxide (SOx) in the exhaust gas reacts with ammonia ($NH_3$), such that a catalyst poisoning material is produced. The catalyst poisoning material may include at least one of ammonium sulfate (($NH_4$)$_2SO_4$), and ammonium bisulfate ($NH_4HSO_4$). The catalyst poisoning material is adsorbed to the catalyst, and degrades activation of the catalyst. Because the catalyst poisoning material is decomposed at a relatively high temperature, it is possible to regenerate the poisoned catalyst by heating the catalyst.

Therefore, when the catalyst is poisoned and activation thereof deteriorates, the operation state is changed to the regeneration operation state, and a temperature in the reactor is increased, such that the catalyst is regenerated.

Figure 5:
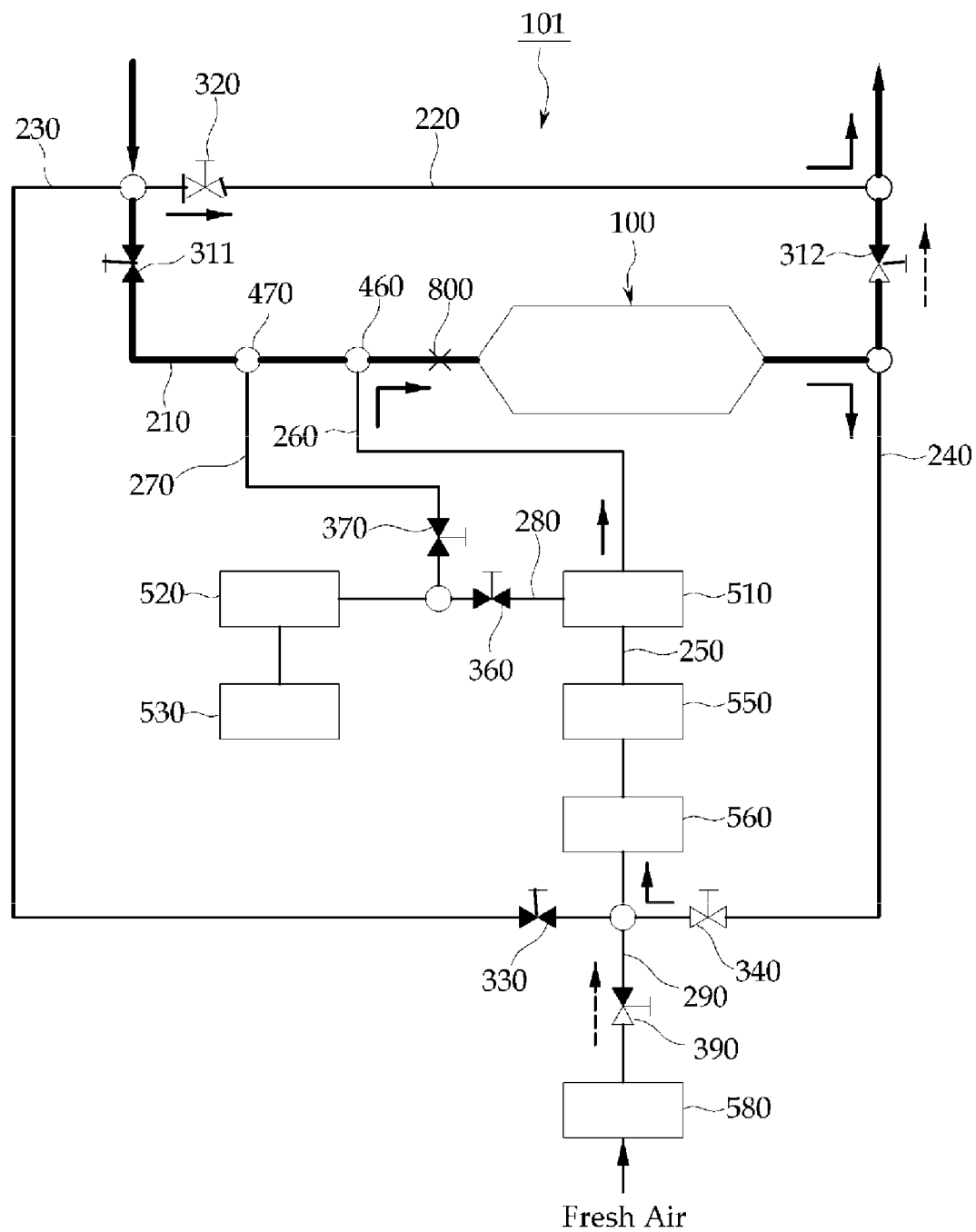

FIG. 5 illustrates the regeneration operation state. As illustrated in FIG. 5, in the regeneration operation state in which the poisoned catalyst is regenerated, the first main exhaust valve 311, the second main exhaust valve 312, and the branch valve 330 are closed. Further, the bypass exhaust valve 320 and the recirculation valve 340 are opened.

In addition, in the exemplary embodiment of the present disclosure, the multifunctional flow path 250 is used for both the NOx Reduction of exhaust gas and the regeneration of the catalyst.

As described above, in the regeneration operation state of the selective catalytic reduction and catalytic regeneration system 101 according to the exemplary embodiment of the present disclosure, a closed loop, which includes the reactor 100, the recirculation flow path 240, the multifunctional flow path 250, and the ammonia supply flow path 260, is formed.

Further, the heating device 550 heats the fluid which circulates through the closed loop, that is, exhaust gas which has passed through the reactor 100, and increases a temperature of the exhaust gas. As described above, according to the exemplary embodiment of the present disclosure, a temperature of the exhaust gas, which circulates through the closed loop, is increased. As a result, it is possible to efficiently increase the temperature of the exhaust gas while allowing the heating device 550 to consume a small amount of fuel. Further, the heated exhaust gas provides thermal energy to the poisoned catalyst to remove the poisoning material.

However, in a case in which a burner is used as the heating device 550, the outside air supply valve 390 installed on the outside air supply flow path 290 is partially opened to supply outside air to the heating device 550 in order to supply oxygen required for combustion in the burner.

In this case, it is possible to maintain constant oxygen concentration in the closed loop by monitoring oxygen concentration in the closed loop by using a sensor, and by controlling the outside air supply valve 390 according to the monitored oxygen concentration.

In addition, in the exemplary embodiment of the present disclosure, to maintain constant pressure in the closed loop, the second main exhaust valve 312 may be partially opened, such that exhaust gas may be discharged to the outside as much as a flow rate of outside air flowing in through the outside air supply valve 390.

In addition, when the catalyst is regenerated, exhaust gas discharged from the diesel engine may be discharged to the outside through the bypass exhaust flow path 220. That is, the catalyst in the reactor 100 may be regenerated without stopping the operation of the diesel engine.

As described above, according to the exemplary embodiment of the present disclosure, the selective catalytic reduction and catalytic regeneration system 101 may minimize overall energy which is to be consumed to reduce nitrogen oxide contained in exhaust gas, and may effectively regenerate a catalyst used for a reduction reaction.

Specifically, it is possible to improve energy utilization efficiency by changing a state of the reducing agent being used in accordance with a temperature of exhaust gas flowing into the reactor 100 during a process of NOx reducing exhaust gas.

In addition, the closed loop is formed during a process of regenerating the catalyst, thereby minimizing energy consumed to regenerate the catalyst.

The exemplary embodiment of the present disclosure has been described with reference to the accompanying drawings, but those skilled in the art will understand that the present disclosure may be implemented in any other specific form without changing the technical spirit or an essential feature thereof.

Accordingly, it should be understood that the aforementioned exemplary embodiment is described for illustration in all aspects and are not limited, and the scope of the present disclosure and the detailed description shall be represented by the claims, and it should be construed that all of the changes or modified forms induced from the meaning and the scope of the claims, and an equivalent concept thereto are included in the scope of the present disclosure.

A reference list for the abbreviations and drawing labels is as follows:

100: Reactor
101: Selective catalytic reduction and catalytic regeneration system
210: Main exhaust flow path
220: Bypass exhaust flow path
230: Branch flow path
240: Recirculation flow path
260: Ammonia supply flow path
270: Urea supply flow path
280: Chamber connecting flow path
290: Outside air supply flow path
311: First main exhaust valve
312: Second main exhaust valve
320: Bypass exhaust valve
330: Branch valve
340: Recirculation valve
360: Ammonia supply valve
370: Urea supply valve
390: Outside air supply valve
460: Ammonia injection unit
470: Urea injection unit
510: Hydrolysis chamber
520: Urea supply unit
530: Urea storage unit
550: Heating device
560: Blower
580: Air filter

The invention claimed is:

1. A selective catalytic reduction and catalytic regeneration system comprising:
a main exhaust flow path along which exhaust gas containing nitrogen oxide (NOx) moves;
a reactor, which is installed on the main exhaust flow path and includes a catalyst for reducing nitrogen oxide (NOx) in the exhaust gas;
a bypass exhaust flow path, which branches off from the main exhaust flow path, bypasses the reactor, and merges with the main exhaust flow path again;
an ammonia injection unit, which is installed on the main exhaust flow path, and injects ammonia (NH₃) to the exhaust gas that flows into the reactor;
a hydrolysis chamber, which is supplied with urea, and produces ammonia to be supplied to the ammonia injection unit;
an ammonia supply flow path, which connects the ammonia injection unit with the hydrolysis chamber;
a branch flow path, which branches off from the main exhaust flow path at a front side of the reactor;
a recirculation flow path, which branches off from the main exhaust flow path at a rear side of the reactor, and merges with the branch flow path; and
a multifunctional flow path, which connects the hydrolysis chamber with a point where the branch flow path and the recirculation flow path merge together.

2. The selective catalytic reduction and catalytic regeneration system of claim 1, further comprising:
a first main exhaust valve, which is installed on the main exhaust flow path between the urea injection unit and a point where the branch flow path branches off;
a second main exhaust valve, which is installed on the main exhaust flow path between a point where the recirculation flow path branches off and a point where the bypass exhaust flow path merges;
a bypass exhaust valve, which is installed on the bypass exhaust flow path;
a branch valve, which is installed on the branch flow path; and
a recirculation valve, which is installed on the recirculation flow path, wherein the first main exhaust valve, the second main exhaust valve, the bypass exhaust valve, the branch valve, and the recirculation valve are separately operated in any one operation state of a purification operation state and a regeneration operation state.

3. The selective catalytic reduction and catalytic regeneration system of claim 2, wherein in the purification operation state, the first main exhaust valve and the second main exhaust valve are opened, and the bypass exhaust valve and the recirculation valve are closed, and wherein in the regeneration operation state, the first main exhaust valve and the second main exhaust valve are closed, and the bypass exhaust valve and the recirculation valve are opened.

4. The selective catalytic reduction and catalytic regeneration system of claim 2, further comprising:
a urea supply unit, which supplies urea to the hydrolysis chamber; and
a chamber connecting flow path, which connects the urea supply unit with the hydrolysis chamber.

5. The selective catalytic reduction and catalytic regeneration system of claim 4, further comprising:
a urea injection unit, which is installed on the main exhaust flow path, and injects urea to the exhaust gas that flows into the reactor; and
a urea supply flow path, which connects the urea supply unit to the urea injection unit.

6. The selective catalytic reduction and catalytic regeneration system of claim 5, wherein the ammonia injection unit is positioned more adjacent to the reactor than the urea injection unit is positioned to the reactor.

7. The selective catalytic reduction and catalytic regeneration system of claim 5, further comprising:
an ammonia supply valve, which is installed on the chamber connecting flow path; and
a urea supply valve, which is installed on the urea supply flow path.

8. The selective catalytic reduction and catalytic regeneration system of claim 7, wherein in the purification operation state, one or more of the ammonia supply valve and the urea supply valve are opened, and wherein in the regeneration operation state, the ammonia supply valve and the urea supply valve are closed.

9. The selective catalytic reduction and catalytic regeneration system of claim 8, wherein in the purification operation state, when a temperature of exhaust gas that flows into the reactor through the main exhaust flow path is at a first preset temperature, the branch valve and the ammonia supply valve are opened, and the urea supply valve is closed, so that ammonia is injected into the main exhaust flow path.

10. The selective catalytic reduction and catalytic regeneration system of claim 8, wherein in the purification operation state, when a temperature of exhaust gas that flows into the reactor through the main exhaust flow path is at a second preset temperature, the branch valve, the ammonia supply valve, and the urea supply valve are opened, so that both ammonia and urea are injected into the main exhaust flow path.

11. The selective catalytic reduction and catalytic regeneration system of claim 8, wherein in the purification operation state, when a temperature of exhaust gas that flows into the reactor through the main exhaust flow path is at a third preset temperature, the branch valve and the ammonia supply valve are closed, and the urea supply valve is opened, so that urea is injected into the main exhaust flow path.

12. The selective catalytic reduction and catalytic regeneration system of claim 1, further comprising:
a heating device, which is installed on the multifunctional flow path, and increases a temperature of a fluid flowing along the multifunctional flow path.

13. The selective catalytic reduction and catalytic regeneration system of claim 12, wherein the heating device is a burner, and wherein the selective catalytic reduction and catalytic regeneration system further includes an outside air supply flow path, which is connected with the multifunctional flow path to supply outside air to the heating device.

14. The selective catalytic reduction and catalytic regeneration system of claim 13, further comprising:
an outside air supply valve, which is installed on the outside air supply flow path,
wherein the outside air supply valve is opened when the heating device is operated.

15. The selective catalytic reduction and catalytic regeneration system of claim 13, further comprising:
an air filter, which is installed on the outside air supply flow path.

16. The selective catalytic reduction and catalytic regeneration system of claim 12, further comprising:
a blower, which is installed on the multifunctional flow path.

17. The selective catalytic reduction and catalytic regeneration system of claim 5, further comprising:
a heating device, which is installed on the multifunctional flow path, and increases a temperature of a fluid flowing along the multifunctional flow path.

18. The selective catalytic reduction and catalytic regeneration system of claim 17, wherein the heating device is a burner, and wherein the selective catalytic reduction and catalytic regeneration system further includes an outside air supply flow path, which is connected with the multifunctional flow path to supply outside air to the heating device.

19. The selective catalytic reduction and catalytic regeneration system of claim 17, further comprising:
a blower, which is installed on the multifunctional flow path.

* * * * *